United States Patent [19]

DalBianco

[11] Patent Number: 5,318,390
[45] Date of Patent: Jun. 7, 1994

[54] TOOL FOR REMOVING RIVETS

[76] Inventor: Mario DalBianco, 24873 Santa Clara St., Hayward, Calif. 94544

[21] Appl. No.: 7,727

[22] Filed: Jan. 22, 1993

[51] Int. Cl.[5] ............................................. B23B 49/00
[52] U.S. Cl. ...................................................... 408/84
[58] Field of Search .......................................... 408/84

[56] References Cited

U.S. PATENT DOCUMENTS

| | | | |
|---|---|---|---|
| 2,296,087 | 9/1942 | Burns, Jr. | 408/81 |
| 2,375,112 | 5/1945 | Kanihan | 408/84 |
| 2,576,786 | 11/1951 | Gray et al. | 408/84 |
| 3,015,240 | 1/1962 | Hodnett | 408/84 |
| 3,620,635 | 11/1971 | DalBianco | 408/84 |
| 3,907,452 | 9/1975 | Tripp | 408/84 X |

*Primary Examiner*—Steven C. Bishop
*Attorney, Agent, or Firm*—Harris Zimmerman

[57] ABSTRACT

A rivet remover has a casing with a rivet contacting region that is shaped for emplacement on a rivet head and has an interior passage that extends to that region. A rotatable drill bit carrier rod is movable along the passage to cause the bit to cut into the rivet head. The carrier rod may extend out of the casing to enable use of an electric drill motor to drive the tool. The rivet contacting region is on a casing end member which may be disengaged and replaced with any of a series of other end members that have differing rivet contacting regions adapted for conforming with rivet heads of differing sizes and/or shapes. The preferred embodiment uses an ordinary twist drill bit and apertures in the casing side wall discharge shavings that are drawn into the casing by the bit. An adjustable stop limits penetration of the bit into rivets to avoid damaging of the riveted structure.

3 Claims, 3 Drawing Sheets

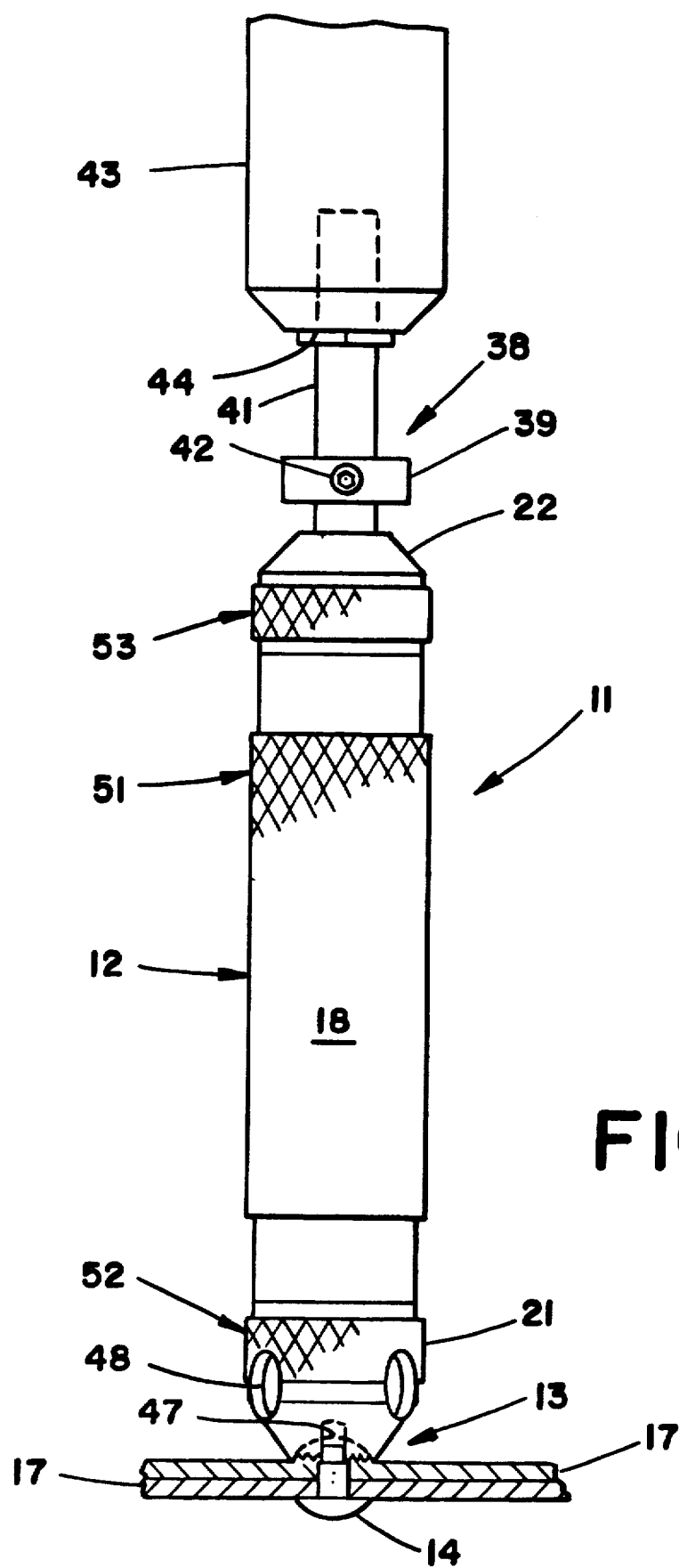
FIG_1

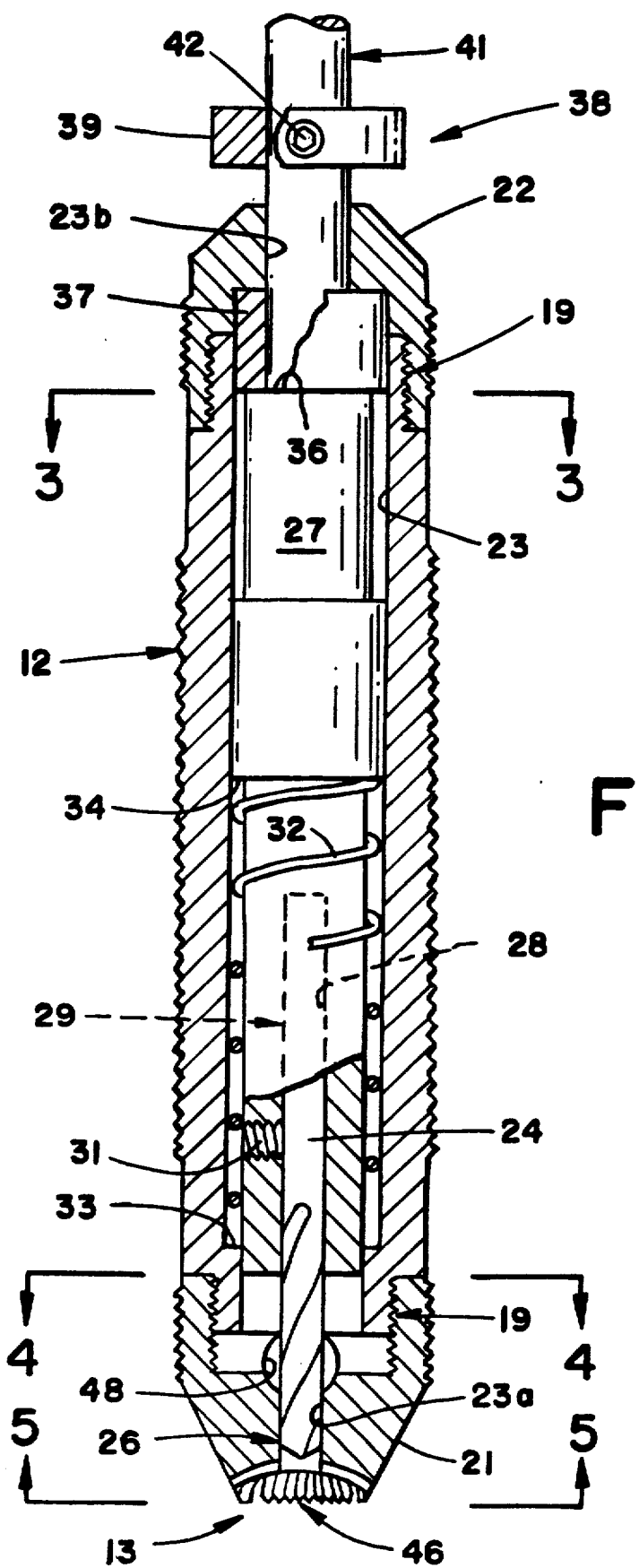
FIG_2

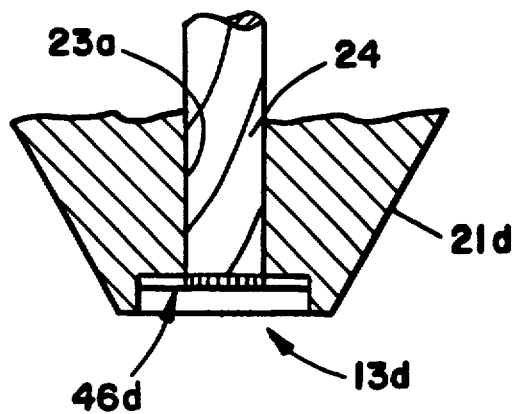
FIG_8
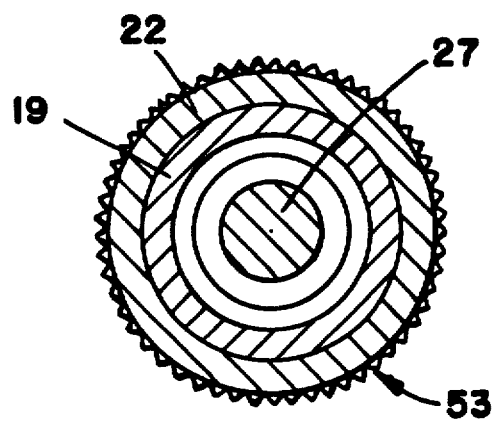
FIG_3
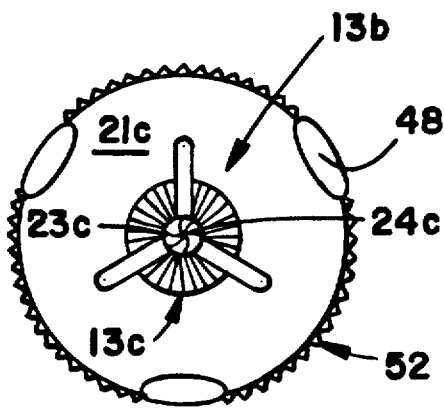
FIG_7
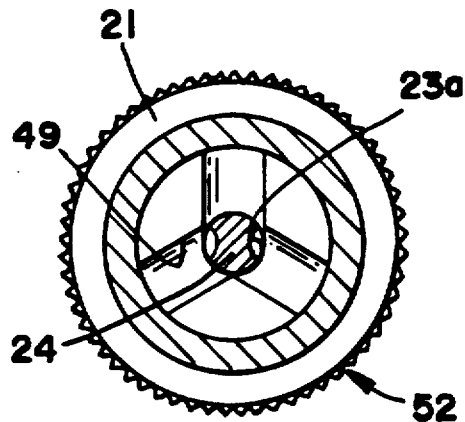
FIG_4
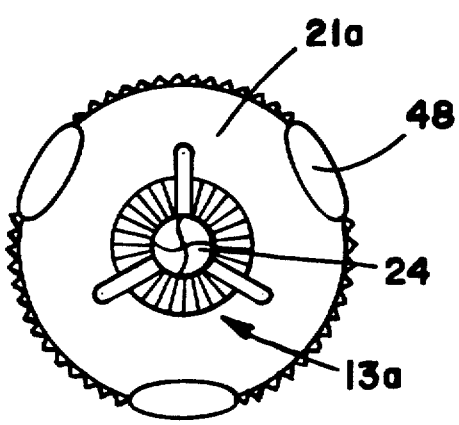
FIG_6
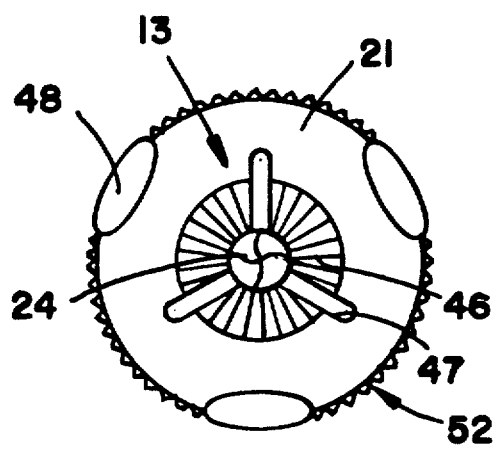
FIG_5

TOOL FOR REMOVING RIVETS

TECHNICAL FIELD

This invention relates to the removal of rivets from riveted constructions and more particularly to tools for use in such operations.

BACKGROUND OF THE INVENTION

Extraction of a rivet requires removal of at least the flange portion of a rivet head at one side of the riveted construction to enable ejection of the rivet at the other side of the construction. Removal of the rivet head with a grinding tool or with a general purpose drill can easily result in damaging of the structural members that are secured together by the rivet. It is difficult to position and control such tools in a manner which will accomplish the desired result without grinding or cutting into the structural members. Such damage may be unacceptable in instances where new rivets will be installed to enable reuse of the riveted structure.

An ordinary drill can also be ineffective for rivet removal in instances where the rivet is loose and simply rotates with the drill.

Prior U.S. Pat. No. 3,620,635, issued Nov. 16, 1971 to Bert L. DalBianco and which is entitled "Rivet Removing Tool", discloses a tool which is specifically designed for rivet removal. One end of a tubular casing of the tool is provided with teeth and is shaped to fit onto the rivet head in a centered relationship. Rotation of the rivet is prevented by exerting pressure on the rivet head with the casing. A rotatable drill bit within the casing may be traveled towards the casing. The bit has teeth of specialized configuration which make a circular cut that separates the peripheral portion of the rivet head from the central portion thereby enabling removal of the remainder of the rivet.

Prior rivet removers of the above discussed kind are proportioned for use with rivets of a particular size or limited range of sizes. Thus a number of such tools of different sizes are needed for optimum performance in extracting rivets of widely varying size. It would be advantageous if a single such tool was adaptable to rivets of diverse different sizes.

Avoiding damage to the riveted structural members during use of the prior rivet removers is dependent on operator skill. It would also be advantageous if the tool itself limited penetration into the rivet head and did so in a manner that is compatible with rivets of varying sizes.

The above discussed prior rivet remover uses a drill bit of specialized configuration which, as noted above, is designed for use on rivets of a particular size or size range. If an ordinary twist drill bit were to be used in the prior rivet removers, the spiral grooves on such a bit would act to draw rivet shavings up into the casing of the tool and the accumulation of such material could adversely affect the operation of the device.

The present invention is directed to overcoming one or more of the problems discussed above.

SUMMARY OF THE INVENTION

In one aspect of the invention, a tool for removing rivets from riveted constructions has a casing with a head end forming a rivet contacting region that is shaped for emplacement on the head of a rivet and having an interior passage which extends to the rivet contacting region. A rotatable drill bit carrier engages the shank end of a drill bit and is slidable along the casing passage to travel the cutting end of the bit into a rivet at the rivet contacting region of the casing. The casing has a head end member which forms the rivet contacting region. The head end member is detachable from other portions of the casing and is replaceable with other head end members which have differing rivet contacting regions.

In another aspect of the invention, the bit is a twist drill bit and the head end member has a hollow interior region through which the bit extends. The head end member further has a side wall with at least one shavings discharge aperture that communicates with the hollow interior region.

In another aspect, the invention provides a tool for removing rivets which includes a casing having a tubular body with first and second threaded opposite ends. A threaded head end member is engaged on the first end and a threaded opposite end member engages on the second end. The casing has an axial passage which extends through the tool body and each of the end members and has a rivet contacting region at the head end member. The rivet contacting region, which is shaped to conform with the head of a rivet, is centered relative to the axial passage and has teeth for gripping a rivet. A rotatable drill bit carrier extends along the axial passage and has an end surface which faces the casing head end member and into which an axially directed bore extends for receiving the shank of a drill bit. The carrier is movable towards the head end member to penetrate the drill bit into a rivet situated at the rivet contacting region. Spring means exert a force which acts to travel the drill bit carrier in the direction of said opposite end member. The tool further includes means for limiting motion of the drill bit carrier in the direction of the head end member which means enables selection of the limit of travel of the carrier in the direction of the head end member.

In still another aspect of the invention, a tool for removing rivets from riveted constructions has a casing with a head end forming a rivet contacting region that is shaped to receive the head of a rivet which is to be removed and in which an interior passage extends to the rivet contacting region, a rotary drill bit disposed in the passage, and a drill bit carrier which is slidable within the passage to cause the drill bit to cut into a rivet head at the rivet contacting region. The tool further includes means for limiting motion of the drill bit carrier in the direction of the rivet contacting region which means enables selection of the depth to which the drill bit can be penetrated into a rivet at the rivet contacting region.

The invention provides a rivet remover having a rivet engaging head that can be detached and replaced with any of a number of other heads which have differing rivet gripping sockets proportioned for removing different sized rivets or rivets of different shapes. In the preferred form the tool limits the depth to which the operator can penetrate a drill bit into a rivet head and thereby avoids damaging of the riveted structural members, the maximum penetration depth being selectable in order to adjust the tool for removing rivets of different sizes. Also in the preferred form, the invention does not require a drill bit of specialized configuration and means are provided for preventing interference with tool operation by accumulations of rivet shavings.

The invention, together with further aspects and advantageous thereof, may be further understood by reference to the following description of the preferred embodiment and by reference to the accompanying drawings.

BRIEF DESCRIPTION OF THE DRAWINGS

FIG. 1 is an exterior view of a rivet removing tool in accordance with the preferred embodiment of the invention, the tool being shown in engagement with a rivet that is to be removed.

FIG. 2 is an axial section view of the tool of the preceding figure.

FIG. 3 is a cross section view of the tool taken along line 3—3 of FIG. 2.

FIG. 4 is a cross section view of the tool taken along line 4—4 of FIG. 2.

FIG. 5 is an end view of the tool taken along line 5—5 of FIG. 2.

FIG. 6 is an end view corresponding to FIG. 5 but depicting a first alternate head end member which may replace the end member which appears in FIG. 5.

FIG. 7 is an end view corresponding to FIG. 5 but showing a second alternate head end member.

FIG. 8 is a longitudinal section view of the head end of the tool depicting a third alternate head end member that adapts the tool for removal of rivets which have flat heads.

DETAILED DESCRIPTION OF THE PREFERRED EMBODIMENT

Referring jointly to FIGS. 1 and 2 of the drawings, a rivet removing tool 11 in accordance with this embodiment of the invention has a generally tubular housing or casing 12 with a socket like rivet contacting region 13 which substantially conforms with the head 14 of a rivet 16 that is to be removed from riveted structural members 17. Casing 12 is formed by a tubular body 18 with externally threaded sleeve portions 19 at each end and by internally threaded end members which engage on the sleeve portions and which include a head end member 21 and a distal end member 22. An axial passage 23 extends through the interior of casing 12 including end members 21 and 22 and has portions 23a and 23b of reduced diameter within end members 21 and 22 respectively.

The rivet contacting socket 13 is an outwardly facing concavity in head end member 21 and is centered on portion 23a of passage 23. A drill bit 24 extends along the centerline or axis of passage 23 and has a cutting end 26 which is directed towards the rivet contacting socket 13 and which extends into portion 23a of passage 23.

Bit 24 is supported and traveled by a rod like drill bit carrier 27 which extends axially within passage 23 of casing 12 and which has an axially directed bore 28 that extends in from the end of carrier that faces towards the rivet contacting region 13. The shank end 29 of bit 24 is seated in bore 28 and is held in place by a threaded set screw 31 that extends radially within the carrier 27 and which enables removal of the bit and replacement with another bit.

Spring means 32 exert a force on carrier 27 that urges the carrier in the direction of distal end member 22 of casing 12. Such means 32 in this example is a helical compression spring disposed in coaxial relationship with carrier 27 and which bears against an annular step 33 in the inner wall of casing body 18 and an annular step 34 in the side wall of the carrier, step 34 being more remote from the rivet contacting region 13 than step 33.

Referring to FIGS. 2 and 3 in conjunction, travel of carrier 27 in the direction of head end member 22 under the influence of spring 32 is limited by abutment of another annular step 36 on the carrier against an annular bushing 37 which is disposed in the end member 22 in coaxial relationship with the carrier. In accordance with one aspect of the invention, adjustable stop means 38 are provided for limiting travel of the carrier 27 and bit 24 in the direction of head end member 21 which means enables selection of the maximum depth of penetration of bit 24 into a rivet at region 13. Such penetration can be varied as necessary to assure severing of the heads of different sized rivets without damaging the structural members that are joined by the rivets. In this example, the adjustable stop means 38 includes an annular collar 39 disposed coaxially on a drive rod extension 41 of carrier 27 that extends out of casing 12 though bushing 37 and the axial passage 23b of distal end member 22. Collar 39 may be slid along extension 41 to a location at which it will abut distal end member 22 and stop further bit travel when the bit has penetrated a rivet just sufficiently to sever the rivet head from the rivet shank. A radially directed threaded set screw 42 is tightened to secure collar 39 at the selected location on drive rod extension 41.

Referring again to FIG. 1, drive rod extension 41 may be engaged with and driven by a portable electric drill of the common type of which only the chuck 43 and jaws 44 are shown in the drawing. It is also possible to provide the tool 11 with its own built in drive motor.

Referring jointly to FIGS. 2, 4 and 5, the concave rivet contacting region 13 at head end member 21 is shaped to conform with the head of a particular sized rivet. This assures that the tool 11 is precisely centered on the rivet head during use. Region 13 of head end member 21 is formed with radially directed arcuate teeth 46 which serve to grip the rivet head when the tool 11 is pressed against the rivet head. This prevents rotation of the rivet by drill bit 24.

The outer end of head end member 21 tapers down to a diameter substantially similar to the diameter of the rivet head and rivet contacting region 13. This facilitates emplacement of the tool 11 at a rivet as the operator can see the rivet prior to the final stage of tool emplacement on the rivet.

As best seen in FIG. 5 in particular, escape of rivet shavings from the rivet contacting socket 13 is provided for by radial slots 47 in the tapered end of head end member 21 which extend from the socket to the side wall of the member, there being three such slots spaced at equiangular intervals around the socket in this particular example.

Referring jointly to FIGS. 2, 4 and 5, a twist drill bit 24 may tend to draw rivet shavings up into the interior of the head end member 21 owing to the spiral grooves which are found on such bits. Escape of shaving that enter the head end member 21 in this manner is provided for by discharge apertures 48 in the side wall of the member which are continuous with radial grooves 49 that extend to the drill bit passage 23a.

The threaded fastening of head end member 21 to the other components of casing 12 makes the member detachable and replaceable with other head end members that have rivet contacting regions 13 of differing configurations to accommodate to rivets of different sizes and/or shapes. FIG. 6, for example, depicts a replacement head end member 21a which is similar to that previously described except that it has a smaller and shallower rivet contacting socket 13a. To accommodate to sizable differences in rivet dimensions, it may be necessary to replace the drill bit 24 as well as the head end member. FIG. 7, for example depicts another replacement head end member 13b that is similar to that previously described except that it has a smaller diameter drill passage 23c as well as a smaller rivet contacting socket 13c and is used with a smaller diameter drill bit 24c in the tool.

Use of the tool 11 is not confined to removal of round headed rivets. FIG. 8, for example, depicts still another replacement head end member 21d which has a flat rivet contacting socket 13d, bounded by teeth 46d, for removing flat headed rivets.

The above described replacement head end members are examples of possible variations of the member and it should recognized that replacements having any of a number of other socket shapes and sizes can be provided.

Referring again to FIGS. 1 and 2, secure gripping of the tool 11 is facilitated by providing a knurled surface 51 on the casing body 18. The end members 21 and 22 are also preferably provided with knurled surfaces 52 and 53 respectively to facilitate replacement of the head end member 21 and to facilitate removal of the distal end member 22 for replacement of bit 24 or for other purposes. Moving components within the casing 12 are preferably lubricated with grease or other lubricant.

In use, the operator grasps the casing 12 with one hand while using the other hand to hold and operate the electric drill 43, 44. The rivet contacting socket 13 is seated on the rivet head 14 and casing 12 is pressed against the rivet head to cause teeth 46 to immobilize the rivet. The electric drill is then turned on to rotate bit 24 and the drill is urged towards casing 12 to penetrate the bit into the rivet head 14. Collar 39 contacts distal end member 22 and stops further penetration into the rivet when the rivet head has been severed from the shank. Spring 32 restores the bit carrier 27, and thus the bit 24 and stop collar 39, to their original positions when the tool 11 is withdrawn from the rivet site.

While the invention has been described with reference to a single embodiment for purposes of example, many modifications and variations of the tool construction are possible and it is not intended to limit the invention except as defined in the following claims.

I claim:

1. In a tool for removing rivets from riveted constructions, said tool having a casing with a head end forming a rivet contacting region that is shaped for emplacement on the head of a rivet that is to be removed and having an interior passage which extends to said rivet contacting region of said head end, a rotary drill bit having a shank end and a cutting end, a rotatable drill bit carrier engaging said shank end of said drill bit and being slidable along said passage to travel said cutting end of said bit into a rivet at said rivet contacting region of said head end, said drill bit carrier having a drive rod for coupling said carrier to a drive motor which drive rod extends out of said casing, wherein the improvement comprises:

said casing having a tubular body and a head end member which forms said head end of said casing including said rivet contacting region, said body and head end member having abutted ends which maintain said body and head end member in fixed relationship relative to each other during operation of said tool, said head end member of said casing being detachable from other portions of said casing and being replaceable with other head members which have differing rivet contacting regions, further including stop means for limiting travel of said drill bit carrier and drill bit in the direction of said head end member which means enables selective variation of the maximum amount of said travel and thereby enables selection of the maximum distance that said cutting end of said bit can penetrate into a rivet.

2. The tool of claim 1 wherein said means for limiting travel of said drill bit carrier and drill bit includes a collar encircling said drive rod of said drill bit carrier at a location outside of said casing and which may be slid along said drive rod to a selected location along said drive rod at which said collar impacts said casing after a selected amount of travel of said drill bit has occurred, and further includes means for selectively enabling and preventing sliding of said collar along said drive rod in order to adjust the maximum travel of said drill bit.

3. A tool for removing rivets from riveted constructions comprising:

a casing having a tubular body with first and second threaded opposite ends and having a threaded head end member engaged on said first end and a threaded opposite end member engaged on said second end, said casing having an axial passage which extends through said body and each of said end members and having a rivet contacting region at said head end member which is shaped to conform with the head of a rivet and which is centered relative to said axial passage and which has teeth for gripping a rivet, a rotatable drill bit carrier extending along said axial passage and having an end surface which faces said head end member of said casing and into which an axially directed bore extends for receiving the shank of a drill bit, said carrier being movable away from a first position thereof and towards said head end member to penetrate a drill bit into the head of a rivet situated at said rivet contacting region, spring means for exerting a force which acts to travel said drill bit carrier towards said first position thereof, and means for limiting motion of said drill bit carrier in the direction of said head end member which means enables selective variation of the limit of travel of said carrier away from said first position thereof.

* * * * *